(12) United States Patent
Urdl et al.

(10) Patent No.: US 11,577,882 B2
(45) Date of Patent: Feb. 14, 2023

(54) PLASTIC TANK AND METHOD OF MANUFACTURING A PLASTIC TANK

(71) Applicant: MAGNA Energy Storage Systems GesmbH, Sinabelkirchen (AT)

(72) Inventors: Christian Urdl, Hitzendorf (AT); Martin Erhart, Graz (AT); Florian Wimmer, Riegersburg (AT); Rainer Puchleitner, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 288 days.

(21) Appl. No.: 17/060,330

(22) Filed: Oct. 1, 2020

(65) Prior Publication Data

US 2021/0078762 A1    Mar. 18, 2021

(51) Int. Cl.
*B65D 6/34* (2006.01)
*B29C 49/20* (2006.01)
(Continued)

(52) U.S. Cl.
CPC .............. *B65D 11/22* (2013.01); *B29C 49/20* (2013.01); *B29C 49/62* (2013.01); *B60K 15/03177* (2013.01); *B65D 11/16* (2013.01); *B29C 2049/2008* (2013.01); *B29C 2049/2065* (2013.01); *B29C 2049/627* (2013.01);
(Continued)

(58) Field of Classification Search
CPC .. B65D 11/22; B65D 11/26; B60K 15/03177; B60K 2015/03046; B60K 2015/03493
See application file for complete search history.

(56) References Cited

U.S. PATENT DOCUMENTS 2,979,431 A * 4/1961 Perrault .................. B29C 48/15
425/197
3,940,002 A * 2/1976 Schiemann ............. B29C 49/20
215/398
(Continued)

FOREIGN PATENT DOCUMENTS

CN    101003177 A    7/2007
CN    103079863 A    5/2013
(Continued)

OTHER PUBLICATIONS

Chinese Search Report for China Patent Application No. 202011208293.4 (dated Mar. 2, 2022).

*Primary Examiner* — Don M Anderson
(74) *Attorney, Agent, or Firm* — Jordan IP Law, LLC; Todd A. Vaughn

(57) ABSTRACT

A tank that includes a tank wall composed of a plastic material, and at least one reinforcing profile member configured to minimize deformation of the plastic tank. The at least one reinforcing profile member is configured for arrangement on an outer side of the tank wall to be engaged by the tank wall and establish a positive material bond connection therewith. The at least one reinforcing profile member has a retaining geometry region with a plurality of openings through and/or into which material of the tank wall extends and onto a rear side of the reinforcing profile member facing away from the tank wall to thereby establish the positive material bond connection between the tank wall and the at least one reinforcing profile member at the retaining geometry region.

20 Claims, 3 Drawing Sheets

(51) Int. Cl.
  B29C 49/62 (2006.01)
  B60K 15/03 (2006.01)
  B65D 6/10 (2006.01)
  B29L 31/00 (2006.01)
(52) U.S. Cl.
  CPC ................ *B29L 2031/7172* (2013.01); *B60K 2015/03046* (2013.01); *B60K 2015/03493* (2013.01)

(56) References Cited

U.S. PATENT DOCUMENTS

| | | | | |
|---|---|---|---|---|
| 4,151,031 A * | 4/1979 | Goad | ...................... | B29C 65/02 |
| | | | | 156/499 |
| 5,059,377 A * | 10/1991 | Ashton | .............. | B29D 99/0014 |
| | | | | 264/225 |
| 6,415,941 B1 | 7/2002 | Huse | | |
| 2010/0227172 A1 * | 9/2010 | Borger | .................... | B29C 70/78 |
| | | | | 428/419 |
| 2014/0034649 A1 | 2/2014 | Criel et al. | | |
| 2018/0036921 A1 * | 2/2018 | Green | .................... | B29C 48/34 |
| 2020/0180427 A1 * | 6/2020 | Fuchs | .................... | B60K 15/03 |

FOREIGN PATENT DOCUMENTS

| | | |
|---|---|---|
| CN | 208882360 U | 5/2019 |
| DE | 42 21 766 A1 | 1/1993 |
| DE | 10 2007 026817 B3 | 10/2008 |
| DE | 10 2008 024024 A1 | 11/2009 |
| EP | 0 353 877 A2 | 2/1990 |
| EP | 2 535 166 A2 | 12/2012 |
| WO | 94/12334 A1 | 6/1994 |
| WO | 9412334 A1 | 6/1994 |

* cited by examiner

PLASTIC TANK AND METHOD OF MANUFACTURING A PLASTIC TANK

CROSS-REFERENCE TO RELATED APPLICATIONS

The present application claims priority 35 U.S.C. § 119 to European Patent Publication No. EP 19208625.4 (filed on Nov. 12, 2019), which is hereby incorporated by reference in its entirety.

TECHNICAL FIELD

Embodiments relate to a plastic tank and a method for producing a plastic tank, and particularly, a tank for a motor vehicle.

BACKGROUND

It is known that plastic tanks, which in recent times have been installed, for example, as fuel tanks of motor vehicles, such as passenger cars and heavy goods vehicles, in addition to having a number of positive characteristics, are problematic in respect of possible deformations of the fuel tank. During the normal operation of tank systems in motor vehicles, large deformations can occur in certain zones of the tank system. Saddle tank systems, and particularly, which may have indentations and the geometry of which is highly dependent on vehicle parts such as the drive shaft and the exhaust system, must have high rigidity in the tunnel region. Combinations of pressure and temperature peaks in zones of the tank can cause large relative movements of the tank shells, especially in the case of plastic tanks, and these must be limited by design measures.

Conventional supporting concepts for reducing the unwanted deformations of the fuel tanks usually use points of support fixed with respect to the body to limit deformations of the tank walls. Particularly for pressurized tank systems, however, these measures are not sufficient, and additional measures must be employed to reduce deformations. Often, the shell thickness of the tank bladder is increased, or reinforcing welded-on components are used to limit deformation. Such measures entail significant losses in the tank volume and thus limit the functioning of the system. For reinforcing components that are attached to a tank wall, there is also the problem that the reinforcing components may become detached, at least in some section or sections, during the use of the plastic tank owing to the loads which occur.

SUMMARY

Embodiments relate to a plastic tank such as, for example, a fuel tank that is enhanced by having a reduction in unwanted deformations without significantly reducing the volume of the fuel tank. The plastic tank and the measure for reducing deformations operate reliably, even in the presence of longer-term loads.

Embodiments relate to a method for producing a deformation-resistant plastic tank of this kind that can be used in the long term.

In accordance with embodiments, a plastic tank comprises a tank wall made of plastic and at least one elongate reinforcing profile member for minimizing unwanted deformation of the plastic tank, wherein the reinforcing profile member is arranged on an outer side of the plastic tank, wherein the material of the tank wall engages around the reinforcing profile, at least in some region or regions, with the result that there is positive retention between the tank wall and the reinforcing profile, wherein a retaining geometry is formed at least in the vicinity of one axial end of the reinforcing profile, wherein the retaining geometry is of wider design, in a plan view of the tank wall of the plastic tank, than other axial portions of the reinforcing profile, wherein the retaining geometry has openings, wherein the material of the tank wall extends through the openings of the retaining geometry and onto the rear side of the reinforcing profile member facing away from the tank wall, with the result that there is positive retention between the tank wall and the reinforcing profile member at the retaining geometry in the region of the openings.

In accordance with embodiments, one reinforcing profile, or preferably a plurality of reinforcing profiles is used and secured by positive retention on the tank wall of a plastic tank. Since elongate reinforcing profiles have a tendency, especially at the axial ends, to become detached from the tank wall after relatively prolonged loading, a reinforcing profile member is to have a retaining geometry in the region of at least one end of the reinforcing profile, which has openings for passage of the material of the tank wall. The retaining geometry is of wider design than other parts of the reinforcing profile, creating more room for openings, and thus, for positive retention of the reinforcing profile member in the region of the end or ends of the reinforcing profile.

Detachment of the reinforcing profile, especially at one end of the elongate reinforcing profile, is thus reliably prevented.

As used herein, the stipulation that "the material of the tank wall" extends through the openings of the retaining geometry should be interpreted to mean that at least the basic material of the tank wall also extends through the openings. If, for example, the material of the tank wall is a fibre-reinforced high-density polyethylene (HDPE) polymer, only the HDPE polymer extends through the openings, for example, and not necessarily the fibre reinforcement.

The reinforcing profile member is preferably composed of fibre-reinforced plastic. The basic material of the reinforcing profile member is preferably high-density polyethylene (HDPE).

The material of the tank wall preferably extends in such a way through the openings of the retaining geometry and onto the rear side of the reinforcing profile member facing away from the tank wall that a materially bonded connection between two melting fronts takes place there. Owing to the openings, and particularly slotted holes, the material thus penetrates from two sides and fuses together. The component is thus completely "encapsulated."

The openings of the retaining geometry preferably comprise a plurality of slotted holes, and particularly a plurality of slotted holes arranged adjacent to one another and/or among one another. And particularly, it is also possible to provide round openings in addition to the slotted holes.

The plastic tank can be a plastic tank for a heavy goods vehicle, and particularly a saddle tank.

In the manner described, at least two or more reinforcing profiles are preferably secured on the tank wall of the plastic tank. The reinforcing profile member or the reinforcing profile members can form stays or ribs on the tank wall. Each reinforcing profile member is preferably substantially T-shaped in order to generate a high geometric moment of resistance.

In accordance with one embodiment of the invention, the rear side of the reinforcing profile member facing away from the tank wall is provided with a layer of the material of the tank wall, and particularly with an HDPE layer, and the material of the tank wall reaches from the tank wall through the openings of the retaining geometry, with the result that the material of the tank wall is welded together from both sides of the reinforcing profile member at the openings of the retaining geometry during the process of producing the plastic tank, with the result that there is positive retention between the tank wall and the reinforcing profile member at the retaining geometry in the region of the openings. This solution is advantageous particularly if the tank wall is of very thin design in the region of the retaining geometry, e.g. through thinning during the process of producing the plastic tank, and particularly by deep drawing. During the process of manufacturing the plastic tank, a material bond can then be produced between the coating, and particularly the HDPE layer, on the retaining geometry and the material, and particularly the HDPE, of the tank wall.

In accordance with embodiments, a method for producing a plastic tank as described above comprises: placing a reinforcing profile member in a shell mould and maintaining the reinforcing profile member in position in the shell mould via a vacuum; forming a tank wall via the vacuum, in which the material of the tank wall is sucked against the walls of the shell mould via the vacuum, wherein during the forming of the tank wall, the material of the tank wall is sucked into or through openings to gives rise to a positive retention between the tank wall and the reinforcing profile.

In accordance with embodiments, a plastic tank is formed in a shell mould by deep drawing via a vacuum which sucks the sheet material against the mould wall. The vacuum for shaping the tank wall of the plastic tank is simultaneously used to hold at least one reinforcing profile member in position in the shell mould during the process of producing the tank wall. The plastic material of the tank wall is sucked against the shells of the shell mould and thus also against the reinforcing profile member by the same vacuum, with the result that the material of the tank wall can get behind regions of the reinforcing profile, and particularly behind undercuts and the like, thus giving rise to positive retention of the reinforcing profile member on the tank wall of the plastic tank. In this case, no materially bonded retention of the reinforcing profile member on the tank wall arises.

Via a reinforcing profile member of this kind, a high reinforcing effect can be achieved with a minimum loss of volume. At the same time, the production of the plastic tank and the reinforcement thereof is very simple, economical and rapid.

Through the use of reinforcing profiles with retaining geometries which have openings, the material of the tank wall can be sucked into or through the openings during the forming of the tank wall and, in the process, particularly secure positive retention can arise between the tank wall and the reinforcing profile member in the region of the retaining geometries. The reinforcing profile member is preferably held in position in the shell mould in such a way that a wider end of the reinforcing profile, and particularly the horizontal bar of the T shape, projects further from the shell mould than a narrower end of the reinforcing profile, and particularly the vertical bar of a T shape. The reinforcing profile member is preferably composed of fibre-reinforced plastic. It is also possible for the reinforcing profile member to be composed of metal.

In accordance with one embodiment of the method, it is possible, during the forming of the tank wall, for the material of the tank wall to be sucked through the openings of the retaining geometry and to extend onto the rear side of the reinforcing profile member facing away from the tank wall, with the result that, in the process, positive retention arises between the tank wall and the reinforcing profile member in the region of the openings of the retaining geometry.

In accordance with one embodiment of the method, the rear side of the reinforcing profile member facing away from the tank wall can be provided with a layer of the material of the tank wall, and particularly with an HDPE layer, and, during the forming of the tank wall, the material of the tank wall can be sucked into the openings of the retaining geometry. Accordingly, the material of the tank wall is welded together from both sides of the reinforcing profile member in the region of the openings of the retaining geometry during the process of producing the plastic tank. In that way, in the process, positive retention arises between the tank wall and the reinforcing profile member in the region of the openings of the retaining geometry. During the method of manufacturing the plastic tank, a material bond can thus be produced between the coating, and particularly the HDPE layer, on the retaining geometry and the material, and particularly the HDPE, of the tank wall. The connection of the reinforcing profile member to the tank wall can be achieved by cold welding or, for example, can be achieved via preheating of the welding surfaces by a hot welding process.

The reinforcing profile member is preferably inserted into a matching recess in the shell mould and held in position in the recess via a vacuum. Before being placed in the shell mould, the reinforcing profile member can be produced by a continuous process, such as extrusion, or by a discontinuous process, such as injection moulding. Before being placed in the shell mould, the reinforcing profile member is preferably bent into a shape matching the subsequent tank wall.

The reinforcing profile member preferably also has a plurality of openings outside the retaining geometries, with the result that, during the forming of the tank wall, the material of the tank wall is sucked through the openings and, in the process, positive retention arises between the tank wall and the reinforcing profile. The strength of the attachment to the plastic container can thereby be increased further.

The material of the tank wall preferably extends in such a way through the openings and onto the rear side of the reinforcing profile member facing away from the tank wall that a materially bonded connection between two melting fronts takes place there. Owing to the openings, and particularly slotted holes, the material thus penetrates from two sides and fuses together. The component is thus completely "encapsulated."

The forming of the tank wall is preferably followed by a cooling process, wherein the material of the tank wall shrinks in such a way during the cooling process that the positive retention between the tank wall and the reinforcing profile member is improved and a pre-stress is produced in the reinforcing element.

The end regions of the reinforcing profile member are preferably of tapered configuration in order to ensure a uniform stress distribution.

DRAWINGS

Embodiments will be illustrated by way of example in the drawings and explained in the description hereinbelow.

DESCRIPTION

Segments of a plastic tank according to the invention, produced in the manner according to the invention, are illustrated in FIGS. 1 to 6.

Figure 6:
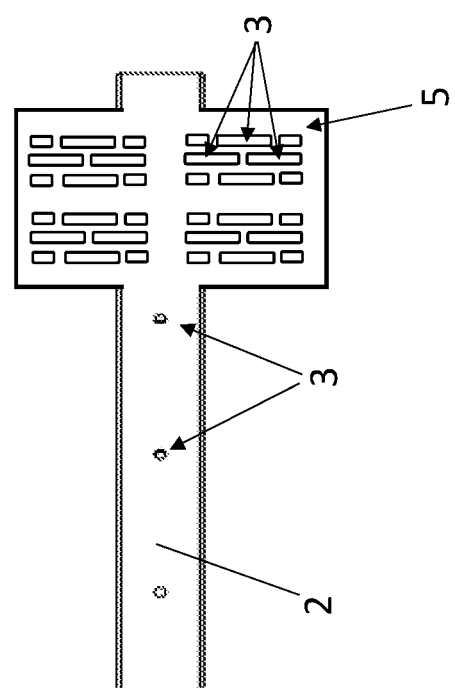
FIG. 6 illustrates a view of a reinforcing profile member from the side facing the tank wall, corresponding to FIG. 2 but with the retaining geometry illustrated.

Here, FIGS. 1 to 5 illustrate the reinforcing profile member 2 only schematically. The retaining geometry 5 in accordance with embodiments, i.e., the widening in the region of one end or both ends of the reinforcing profile, is not illustrated. In FIG. 6, the retaining geometry 5 is illustrated in a plan view of the tank wall.

In the illustrated embodiment, the plastic tank comprises a tank wall 1 composed of plastic, e.g., HDPE, and at least one reinforcing profile member 2 for minimizing an unwanted deformation of the plastic tank. During production of the plastic tank, the reinforcing profile member 2 is placed in a shell mould and maintained in position in the shell via a vacuum, in which the material of the tank wall 1 is sucked against the walls of the shell mould via the vacuum in order to form the tank wall 1. During the forming of the tank wall 1, the material of the tank wall 1 is thereby sucked around the reinforcing profile member 2 and, in so doing, positive retention between the tank wall 1 and the reinforcing profile member 2 is established. The reinforcing profile member 2 may have a T-shaped cross-section and, as a result, has undercuts, behind which the material of the tank wall 1 can engage. Therefore, there is no materially bonded retention between the reinforcing profile member 2 and the tank wall 1.

Figure 2:
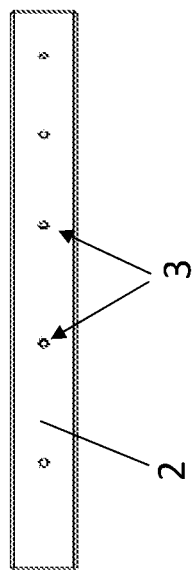
FIG. 2 illustrates a schematic view of a reinforcing profile member from the side facing the tank wall.
Figure 3:
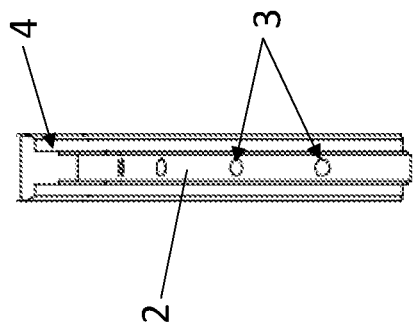
FIG. 3 illustrates a schematic view of a reinforcing profile member shown in FIG. 2, from the side facing away from the tank wall.
Figure 1:
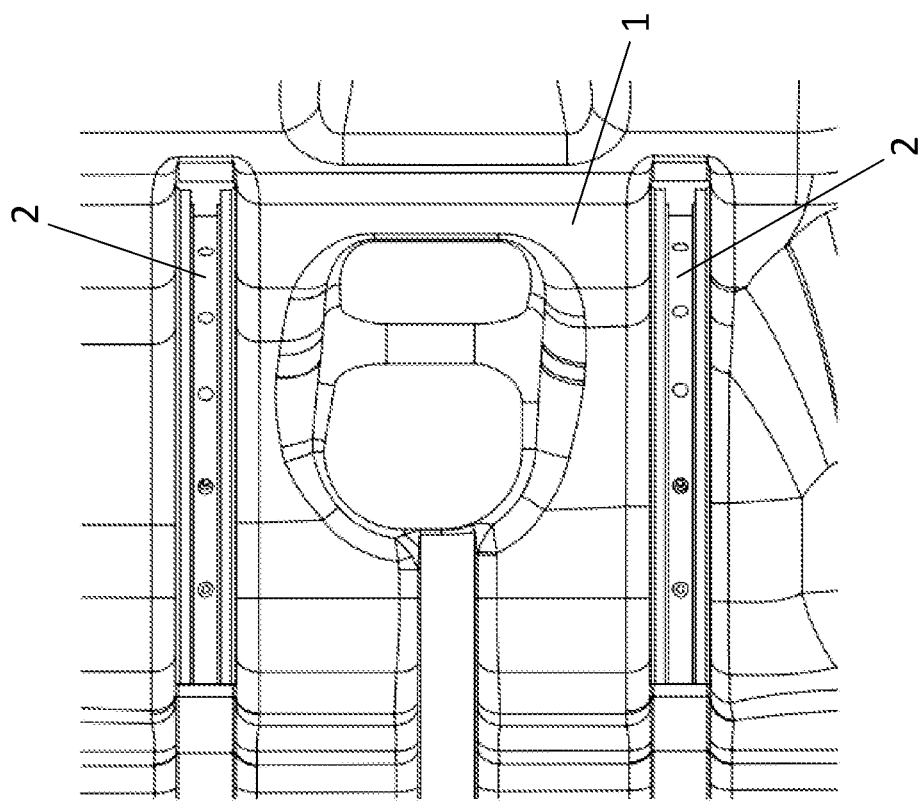
FIG. 1 illustrates a schematic view from the outside of a segment of a plastic tank, in accordance with embodiments.
Figure 5:
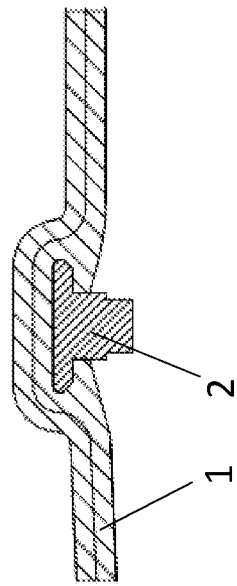
FIG. 5 illustrates a sectional view of the section A-A shown in FIG. 4.
Figure 4:
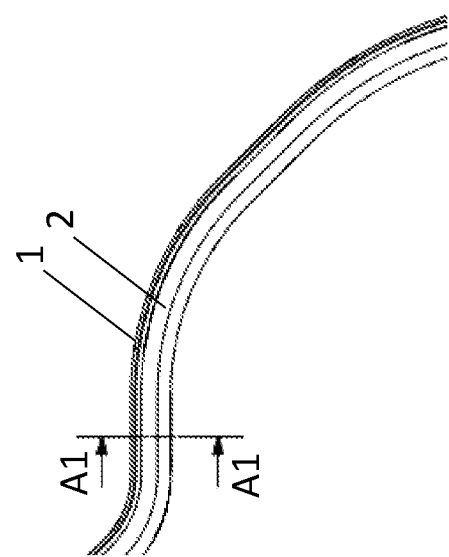
FIG. 4 illustrates a schematic view of a plastic tank shown in FIG. 1, from the side, and shows the position of the section A-A.

Assembly is thus accomplished by the positive enclosure of the tank shell material in the joining process. The reinforcing profiles 2 are placed in the open shell mould, in a cavity provided for this purpose, and are held in position by application of a vacuum. Simultaneously or separately or in a further step, the tank wall 1 is sucked around the profile of the reinforcing profiles 2 by the application of the vacuum. In this way, the connection between rib elements, i.e. reinforcing profiles 2, and the tank bladder, i.e., the tank wall 1, is already achieved during the shaping process. Assembly is accomplished by positive engagement, as is readily apparent from the shape of the reinforcing profile member 2 in FIGS. 1, 3, and 5, for example. Penetration of the inserted reinforcing profile member 2 by the molten shell material, i.e. the material of the tank wall 1, is also possible. For this purpose, openings 3 can be formed in the reinforcing profile member 2, as illustrated in FIGS. 1 to 3. This produces additional strength through additional undercuts.

Additional pressure on the tank wall 1 toward the rib or reinforcing profile member 2 can be achieved by the shrinkage of the shell material by roughly 3% in the cooling process. Shrinkage in the longitudinal direction of the rib 2 can be allowed via a suitable aperture or recess 4 for length compensation in the tapering region of the ribs 2.

The reinforcing profiles are composed of a material exhibiting high strength and high bending stiffness. For this purpose, fibre-reinforced plastics and metal components, and particularly, may be considered.

The production of the reinforcing profiles 2 may optionally be carried out via a discontinuous process, such as injection moulding, or a continuous process, such as extrusion of a profile.

A reinforcing profile member 2 can be bent into shape by a forming process.

The geometrical embodiment of each reinforcing profile member 2 can be embodied in such a way that a positive and non-positive but not materially bonded connection can be entered into between the tank wall 1 and the reinforcing element 2. The geometry of the reinforcing element 2 is matched to the tank geometry. Preferred geometries are stays on the tank shell.

Each reinforcing profile member 2 can have a plurality of openings 3, with the result that, during the forming of the tank wall 1, the material of the tank wall 1 is sucked through the openings 3 and, in the process, improved positive retention arises between the tank wall 1 and the reinforcing profile member 2.

As illustrated in FIG. 6, a retaining geometry 5 is formed at least in the vicinity of one axial end of the reinforcing profile member 2, wherein, in a plan view of the tank wall 1 of the plastic tank—illustrated in FIG. 6, the retaining geometry 5 is of wider design than other axial portions of the reinforcing profile member 2, and particularly wider than a central part of the reinforcing profile member 2.

The retaining geometry 5 has a plurality of openings 3, with the result that the material of the tank wall 1 can extend through the openings 3 of the retaining geometry 5 and onto the rear side of the reinforcing profile member 2 facing away from the tank wall, with the result that there is positive retention between the tank wall 1 and the reinforcing profile member 2 at the retaining geometry 5 in the region of the openings 3.

The openings 3 of the retaining geometry 5 comprise a plurality of slotted holes, which are arranged adjacent to one another and among one another, i.e. in a plurality of rows and a plurality of columns. The openings 3 of the retaining geometry are arranged symmetrically on the left and right of the longitudinal central axis of the reinforcing profile member 2.

The rear side of the reinforcing profile member 2 facing away from the tank wall 1 can be provided with a layer of the material of the tank wall 1, and particularly with an HDPE layer. From the tank wall 1, the material of the tank wall 1 can then reach through the openings 3 of the retaining geometry 5, with the result that the material of the tank wall is welded together from both sides of the reinforcing profile member 2 at the openings 3 of the retaining geometry 5 during the process of producing the plastic tank, with the result that there is positive retention between the tank wall 1 and the reinforcing profile member 2 at the retaining geometry 5 in the region of the openings 3.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Tank wall
2 Reinforcing profile member
3 Opening
4 Recess
5 Retaining geometry

What is claimed is:

1. A tank, comprising:
a tank wall composed of a plastic material; and
at least one reinforcing profile member, configured to minimize deformation of the tank, the at least one reinforcing profile member configured for arrangement on an outer side of the tank wall to be engaged by the tank wall and establish a positive material bond connection therewith, the at least one reinforcing profile member having a retaining geometry region extending at least in a vicinity of an axial end of the at least one reinforcing profile member, the retaining geometry region having a wider design than other axial portions of the at least one reinforcing profile member, in a planar view of the tank wall,
wherein the retaining geometry region has a plurality of openings through and/or into which material of the tank wall extends and onto a rear side of the reinforcing profile member facing away from the tank wall to thereby establish the positive material bond connection between the tank wall and the at least one reinforcing profile member at the retaining geometry region.

2. The tank of claim 1, wherein the at least one reinforcing profile member is composed of fibre-reinforced plastic and/or HDPE.

3. The tank of claim 1, wherein the openings of the retaining geometry region comprise slotted holes arranged adjacent to one another and/or among one another.

4. The tank of claim 1, wherein the rear side of the at least one reinforcing profile member facing away from the tank wall is provided with a material layer of the same composition of the tank wall to establish, during formation of the tank wall, the positive material bond connection at both sides of the at least one reinforcing profile member adjacent to the openings.

5. The tank of claim 1, wherein:
the other axial portions of the at least one reinforcing profile member comprise a second plurality of openings,
the material of the tank wall extends through and/or into the second plurality of openings and onto the rear side of the at least one reinforcing profile member facing away from the tank wall to establish another positive material bond connection between the tank wall and the at least one reinforcing profile member.

6. The tank of claim 1, wherein the material of the tank wall extends through and/or into the plurality openings of the retaining geometry and/or through and/or into a second plurality of openings the other axial portions of the at least one reinforcing profile member and onto the rear side of the at least one reinforcing profile member facing away from the tank wall to establish another positive material bond connection between the tank wall and the at least one reinforcing profile member.

7. A tank, comprising:
a tank wall composed of a plastic material;
at least one reinforcing profile member, configured to minimize deformation of the tank, the at least one reinforcing profile member configured for arrangement on an outer side of the tank wall to be engaged by the tank wall and establish a positive material bond connection therewith, the at least one reinforcing profile member having a retaining geometry region at an axial end thereof, the retaining geometry region being wider than other axial portions of the at least one reinforcing profile member in a planar view of the tank wall, the retaining geometry region having a plurality of openings through which material of the tank wall extends and onto a rear side of the reinforcing profile member to thereby establish the positive material bond connection between the tank wall and the at least one reinforcing profile member at the retaining geometry region.

8. The tank of claim 7, wherein the at least one reinforcing profile member is composed of fibre-reinforced plastic and/or HDPE.

9. The tank of claim 7, wherein the openings of the retaining geometry region comprise slotted holes arranged adjacent to one another and/or among one another.

10. The tank of claim 7, wherein the rear side of the at least one reinforcing profile member facing away from the tank wall is provided with a material layer of the same composition of the tank wall to establish, during formation of the tank wall, the positive material bond connection at both sides of the at least one reinforcing profile member adjacent to the openings.

11. The tank of claim 7, wherein:
the other axial portions of the at least one reinforcing profile member comprise a second plurality of openings,
the material of the tank wall extends through and/or into the second plurality of openings and onto the rear side of the at least one reinforcing profile member facing away from the tank wall to establish another positive material bond connection between the tank wall and the at least one reinforcing profile member.

12. The tank of claim 7, wherein the material of the tank wall extends through and/or into the plurality openings of the retaining geometry and/or through and/or into a second plurality of openings the other axial portions of the at least one reinforcing profile member and onto the rear side of the at least one reinforcing profile member facing away from the tank wall to establish another positive material bond connection between the tank wall and the at least one reinforcing profile member.

13. A method for producing a tank, the method comprising:
placing at least one reinforcing profile member in a shell mould, the at least one reinforcing profile member having a retaining geometry region extending at least in a vicinity of an axial end of the at least one reinforcing profile member, the retaining geometry region having a plurality of openings;
simultaneously forming a tank wall composed of a plastic material, maintaining a position of the at least one reinforcing profile member in the shell mould, and establishing a positive material bond connection between the tank wall and the at least one reinforcing profile member via application of a vacuum such that material of the tank wall flows against the walls of the shell mould and through and/or into the openings and onto a rear side of the reinforcing profile member facing away from the tank wall to thereby establish a positive material bond connection between the tank wall and the at least one reinforcing profile member at the retaining geometry region,
wherein:
the at least one reinforcing profile member is configured to minimize deformation of the tank,
the at least one reinforcing profile member is configured for arrangement on an outer side of the tank wall to be engaged by the tank wall and establish the positive material bond connection therewith, and
the at least one reinforcing profile member has a retaining geometry region extending at least in a vicinity of an axial end of the at least one reinforcing profile member, the retaining geometry region having a wider design than other axial portions of the at least one reinforcing profile member in a planar view of the tank wall.

14. The method of claim 13, wherein during the establishment of the positive material bond connection between the tank wall and the at least one reinforcing profile member, the material of the tank wall flows through and/or into the openings and extends onto a rear side of the reinforcing profile member facing away from the tank wall, in the region of the openings.

15. The method of claim 13, further comprising providing the rear side of the at least one reinforcing profile member facing away from the tank wall with a material layer of the same composition of the material of the tank wall such that during the formation of the tank wall, the material of the tank wall flows through and/or into the openings of the retaining geometry to establish the positive material bond connection at both sides of the at least one reinforcing profile member adjacent to the openings.

16. The method of claim 13, wherein placing the at least one reinforcing profile member in the shell mould comprises inserting the at least one reinforcing profile member into a matching recess of the shell mould.

17. The method of claim 13, further comprising, before placing the at least one reinforcing profile member in the shell mould, fabricating the at least one reinforcing profile member by a continuous process comprising extrusion.

18. The method of claim 13, further comprising, before placing the at least one reinforcing profile member in the shell mould, fabricating the at least one reinforcing profile member by a discontinuous process comprising injection moulding.

19. The method of claim 13, further comprising, before placing the at least one reinforcing profile member in the shell mould, bending the at least one reinforcing profile member into a shape that corresponds to an intended shape of the tank wall.

20. The method of claim 13, further comprising, after simultaneously forming the tank wall, maintaining the position of the at least one reinforcing profile member, and establishing the positive material bond connection, conducting a cooling process on the formed tank wall to shrink the material of the tank wall and enhance the positive material bond connection between the tank wall and the reinforcing profile member.

* * * * *